Patented Oct. 7, 1947

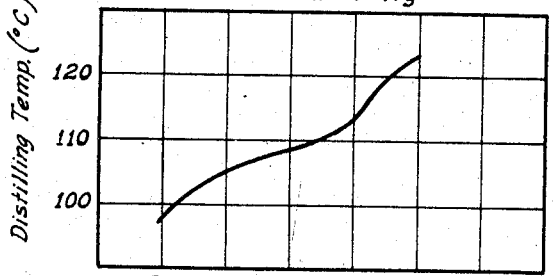
Fig. 1 Acetic Oil Distilled (% by weight)
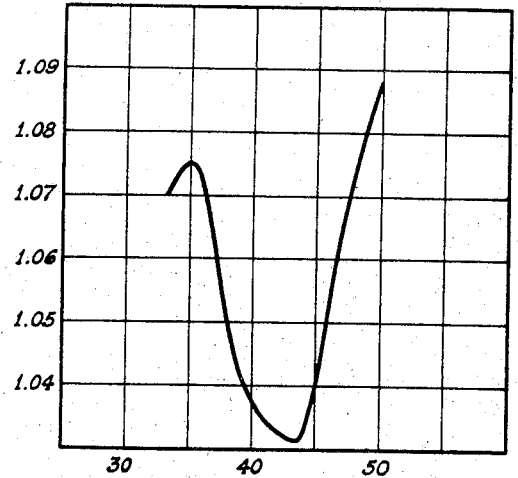
Fig. 2 Acetic Oil Distilled (% by weight)
INVENTORS
Alfred A. Reiter
Floyd L. Beman
BY
Griswold & Burdick
ATTORNEYS

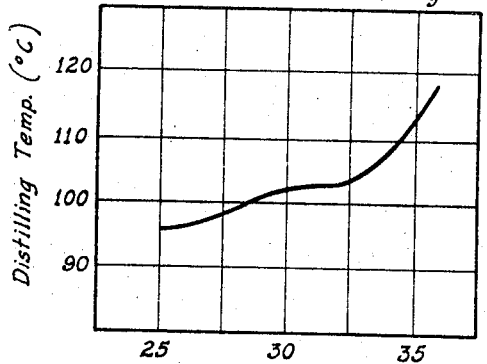
Fig. 3 Acetic Oil Distilled (% by Volume)
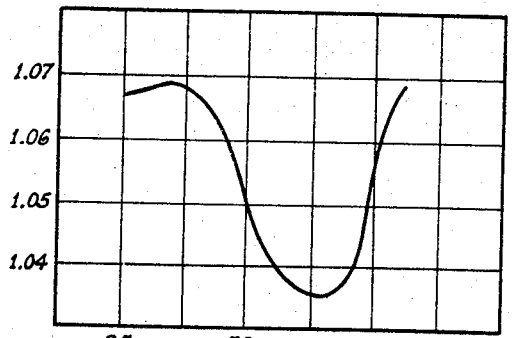
Fig. 4 Acetic Oil Distilled (% by Volume)

2,428,760

UNITED STATES PATENT OFFICE 2,428,760

DISTILLATION OF 2-ACETOXY-BUTANAL FROM WOOD DISTILLATE

Alfred A. Reiter and Floyd L. Beman, Marquette, Mich., assignors to Cliffs Dow Chemical Company, Marquette, Mich., a corporation of Michigan Application October 30, 1943, Serial No. 508,424

6 Claims. (Cl. 202—40)

This application is a continuation-in-part of our prior application, Serial No. 460,169, filed September 29, 1942, and represents a further contribution to the art.

This invention relates to the isolation from pyroligneous acid of certain products not previously known to exist therein. It concerns particularly a new compound, 2-acetoxy-butanal, and its separation from a certain residue fraction of pyroligneous acid.

In the more recently developed methods for the treatment of pyroligneous acid, particularly that derived from hardwoods, by distillation and extraction methods for the recovery of methanol, acetone, and acetic acid, and residues which, in the older liming process, usually appeared as tar are separated to a considerable extent into settled tars and a mixture of organic compounds which are soluble in the crude aqueous acetic acid remaining after the pyroligneous acid is settled and demethanolized, and which may be steam-distilled from the aqueous solution along with the acetic acid. Such mixture of dissolved organic compounds usually appears as a non-tarry organic liquid after removal of the water and a major portion of the lower aliphatic acids from the distillate obtained by exhaustive steam-distillation of demethanolized and settled pyroligneous acid, and is herein designated as "acetic oil" to distinguish it from other portions of tars or oils appearing in the process. In one typical process, the acetic oil is obtained by steam-distilling the settled and demethanolized pyroligneous acid without prior chemical treatment, extracting the aqueous distillate with an organic solvent, such as ethyl acetate, butyl acetate, ether, mixtures of ethyl acetate with isopropyl ether, etc., recovering the solvent by distilling it from the extract at atmospheric pressure, and fractionally distilling the remaining portion of the extract under reduced pressure to recover crude acetic acid and leave the acetic oil as a still residue. Acetic oil so obtained corresponds closely with the still residue remaining when the crude acid of United States Patent 2,197,069 is fractionally distilled under reduced pressure to recover therefrom a major proportion of the acetic acid. Acetic oil amounts to a substantial portion of the total organic products obtained from pyroligneous acid produced in the destructive distillation of hardwoods, such as beech, maple, birch, and oak.

Although the character of the acetic oil obtained as described above may vary somewhat, depending upon the exact manner of carrying out the several operations of the process, it is usually obtained as a substantially anhydrous, non-viscous, acidic liquid which is at least partially soluble in water or dilute acetic acid and which is miscible with most organic solvents. The specific gravity of the acetic oil is usually greater than 1.0.

Attempts to recover valuable components from the acetic oil by conventional methods involving treatment with alkalies or acids or distillation at atmospheric pressure lead to excessive decomposition. Fractional distillation under reduced pressure by the ordinary procedures, even with a high reflux ratio, is not feasible because the gradual and substantially constant rise of the distilling temperature and the variations in composition mentioned above make it impossible to select accurately a fraction rich in a single component. Little, if any, information as to the composition of this oil has heretofore been available other than that it contains phenolic substances, and that small amounts of volatile acids, e. g. acetic and propionic acids, may be recovered from it by steam-distillation. The principal use for acetic oil has heretofore been as fuel.

We have discovered that a hitherto undescribed compound, 2-acetoxy-butanal, is one of the components of acetic oil and that it may be isolated readily in the manner herein described. Other components of the acetic oil, as disclosed in the copending application just referred to, include in addition to acetic and propionic acids, butyric acid, crotonic acid, acetol, acetol acetate, guaiacol, creosol, and minor amounts of phenol.

The 2-acetoxy-butanal is a colorless mobile liquid with a characteristic odor. It boils at 106° C. under a pressure of 50 millimeters of mercury and at 186° C. under a pressure of 744 millimeters of mercury. It has a specific gravity of 1.035 at 25/25° C., a refractive index of $1.4222 n_D$ at 25° C., and a freezing point of —0.5° C. Upon saponification, it yields acetic acid and an alcohol boiling at 48.5° C. under a pressure of 13 millimeters of mercury and having a freezing point of —32.5° C. The alcohol reduces Fehling's solution in the cold and yields a red coloration with Schiff's reagent. It forms a paranitrophenylhydrazone melting at 167.5° to 168° C. and a paranitrophenylosazone melting at 267° C. Upon hydrogenation of the 2-acetoxy-butanal over a Raney nickel catalyst at 150° C. and saponification of the hydrogenated product, butanediol-1.2 is obtained having a boiling point of 193° C. under a pressure of 745 millimeters of mercury and a specific gravity of 0.9995 at 25/25° C. The compound 2-acetoxy-butanal is useful as an agent from which the above-mentioned derivatives thereof may be prepared.

Attempts to collect fractions sufficiently rich in 2-acetoxy-butanal to permit isolation of the product in a substantially pure state by fractionally distilling the acetic oil under reduced pressure and selecting the fraction in the usual manner have been uniformly unsuccessful. The difficulty of controlling the fractionation by observing the distilling temperatures is illustrated in Figure 1 of the drawing, in which the vapor temperature of the material distilling in the neighborhood of 106° C. under a pressure of 50 millimeters of mercury, i. e. in the neighborhood of the boiling point of acetoxy-butanal at 50 millimeters pressure, noted periodically during a distillation of a representative sample of acetic oil, are plotted against the per cent by weight of the acetic oil distilled.

We have found, however, that when the specific gravity of the material distilling in the neighborhood of 106° C. under a pressure of 50 millimeters of mercury is continuously determined, it varies in such a manner that it passes through a region wherein its average rate of change with respect to the amount of material distilled is relatively small, and, furthermore, that the material distilling while the specific gravity is passing through this region is rich in 2-acetoxy-butanal. The graph in Figure 2 of the drawing was obtained by fractionally distilling a sample of acetic oil and plotting the specific gravity of the material distilling during the distillation against the per cent by weight of acetic oil distilled. The region in which the rate of change of the specific gravity with respect to the amount of material distilled is relatively small is represented by the portion of the graph near the minimum point. The rate of change of the specific gravity actually reached the value of zero when the specific gravity was 1.031. It is thus possible to select a fraction of acetic oil rich in 2-acetoxy-butanal by fractionally distilling the oil through an efficient fractionating column, and beginning collection of the fraction, which distills in the neighborhood of 106° C. when under a pressure of 50 millimeters of mercury, when the specific gravity of the material distilling is approaching a region wherein its average rate of change with respect to the amount of material distilled becomes relatively small, and terminating the collection of the fraction when the specific gravity has passed through and is receding from said region. The distillation may be carried out at any desired pressure, but it is usually carried out under subatmospheric pressure and preferably below 400 millimeters of mercury since some decomposition of the less heat-stable components of the oil may occur at higher temperatures. Although the collection of the fraction is controlled by means of specific gravity determinations, it is advantageous to observe the distilling temperature during the collection of the fraction, since at a given pressure the general temperature range in which the fraction distills will ordinarily include or lie close to, e. g. within about 15° C., of the boiling point of 2-acetoxy-butanal at the corresponding pressure, and will thus serve to differentiate it from other fractions of the acetic oil which may be collected over the same range of specific gravity but over different temperature ranges. The range of distilling temperatures observed during the collection of the fraction may, but does not necessarily, include the boiling temperature at the distillation pressure of pure 2-acetoxy-butanal. The 2-acetoxy-butanal fraction is then neutralized, i. e. treated with sufficient alkali to form the metal salts of any free acids which may have distilled with the 2-acetoxy-butanal from the acetic oil.

Alternatively, the acetic oil may be first neutralized and then fractionally distilled, the 2-acetoxy-butanal fraction being collected in the manner previously described. In this case neutralization of the 2-acetoxy-butanal fraction collected is not ordinarily necessary. The distilling temperature and the specific gravity of the material distilling in the neighborhood of 106° C. under a pressure of 50 millimeters of mercury noted continuously during the distillation of a representative sample of neutralized acetic oil, are shown in Figures 3 and 4, respectively, of the drawing, plotted against the per cent by volume of material distilled. Figure 3 illustrates the gradual rise in the distilling temperature during the distillation, and Figure 4 illustrates the passage of the specific gravity of the material distilling through a region wherein its average rate of change with respect to the amount of material distilled is relatively small, i. e. the region in which the material distilling is rich in 2-acetoxy-butanal. This region is represented by the part of the graph which lies near to and includes the minimum point, at which point the rate of change of the specific gravity with respect to the amount of material distilled passes through the value zero.

Neutralization of the acetic oil or of the 2-acetoxy-butanal fraction obtained by distilling the acetic oil is usually accomplished by adding an amount of an alkali such as sodium carbonate, potassium carbonate, sodium hydroxide, sodium bicarbonate, calcium hydroxide, etc., sufficient to give the mixture a pH of from about 5.5 to about 8. An excess of alkali over that sufficient to combine with any free acids present is usually avoided, since such excess of alkali will tend to cause hydrolysis of the 2-acetoxy-butanal. Neutralization is usually carried out at temperatures below 80° C. and preferably below 40° C. to reduce hydrolysis of the 2-acetoxy-butanal to a minimum. Sufficient water may be used to dissolve the salts formed, although an excess is preferably avoided since 2-acetoxy-butanal is soluble in water and is more easily separated from the aqueous portion of the neutralized mixture if the concentration of salts in the aqueous portion is kept as high as possible. After neutralization is complete, the neutral components of the mixture, which usually form a distinct layer, are separated from the solution of the salts formed during the neutralization, either mechanically or by extracting with a water-immiscible organic solvent, e. g. with carbon tetrachloride, ethyl acetate, benzene, ether, etc., and subsequently distilling the extract to recover the solvent. Water-soluble compounds, such as sodium chloride, may be added to the neutralized mixture to facilitate the separation of the 2-acetoxy-butanal, although this is not usually desirable when acids are to be recovered from the aqueous portion of the mixture. Alternatively, a substantially dry alkaline material, such as powdered sodium carbonate, may be used to neutralize the acids present in the 2-acetoxy-butanal fraction and the neutral oils may be separated from the solid salts so formed by decanting or filtering.

The salts formed during the neutralization may be treated in any suitable manner to recover the acidic compounds originally present in the acetic oil, preferably by acidifying with mineral acids to liberate the organic acids and subsequently separating and fractionally distilling the crude acids so obtained. Crotonic acid may be recovered in this manner from the salts formed during neutralization of the 2-acetoxy-butanal fraction obtained by fractionally distilling acetic oil. The salts formed during the neutralization of acetic oil before fractionation may be treated in a similar manner to recover acetic, propionic, butyric, crotonic and higher boiling acids.

The neutral 2-acetoxy-butanal fraction resulting from the neutralization and fractional distillation steps just described may, if desired, be further purified, e. g. by refractionating. In the case of neutral 2-acetoxy-butanal fractions obtained by first fractionally distilling the acetic oil and then neutralizing the 2-acetoxy-butanal fraction, refractionation is preferably preceded by a simple distillation to free the material from the last traces of salts, since prolonged heating of the 2-acetoxy-butanal with such salts may cause considerable decomposition or other by-product formation. Refractionation of the 2-acetoxy-butanal fraction is usually carried out under reduced pressure, and the 2-acetoxy-butanal collected when the boiling point of the material distilling is near that of pure 2-acetoxy-butanal at the distillation pressure.

Certain advantages of the invention will be seen from the following examples, which are illustrative and are not to be construed as limiting the invention:

Example 1

1360 pounds of unneutralized acetic oil were distilled under a pressure of a little more than 50 millimeters of mercury through an efficient fractionating column while maintaining a reflux ratio of about 8 to 1. The specific gravity at 25° C. and the temperature of the vapor in the still head were noted from time to time. The distilling temperature rose gradually without remaining constant at any point for an appreciable time. The rate of change of the specific gravity of the material distilling with respect to the weight of material distilled varied in a substantially regular manner through a series of regions in which its value was successively relatively small and relatively large. When the vapor temperature had reached 108° C. and the specific gravity of the material distilling was 1.046 and decreasing the collection of a fraction rich in 2-acetoxy-butanal was begun. The collection of the fraction was continued until the specific gravity, after having decreased to 1.031, had increased to 1.058 at which point the collection of the fraction was terminated. The fraction weighed 108.4 pounds.

Several fractions rich in 2-acetoxy-butanal collected in the manner just described were combined and 1680 pounds of the mixture was neutralized to a pH of about 7 with 145 pounds of sodium carbonate and 810 pounds of water. The neutralized mixture separated into two layers upon standing. The oily layer which weighed 1286 pounds was distilled without fractionation under a pressure of 20 millimeters of mercury to free it from traces of salts and the distillate which weighed 1181 pounds was then redistilled under a pressure of a little over 50 millimeters of mercury through an efficient fractionating column while maintaining a reflux ratio of about 8 to 1. The fraction boiling between 107° and 115° C. was collected. The fraction collected weighed 655 pounds and was more than 90 per cent pure 2-acetoxy-butanal.

Example 2

36,000 c. c. of acetic oil was mixed with 36,000 c. c. of water and neutralized to a pH of 7 with 2880 grams of powdered sodium carbonate while maintaining the temperature of the mixture below 40° C. 26,500 c. c. of an oily layer was separated from the mixture and distilled under vacuum without fractionation. The distillate was then distilled under a pressure of 50 millimeters of mercury through an efficient fractionating column while maintaining a reflux ratio of about 10 to 1. The specific gravity at 25° C. of the material distilling and the distilling temperature were noted periodically. A fore-fraction of 10,800 c. c. was collected. At this point, the specific gravity of the material distilling was 1.050 and decreasing and the distilling temperature was 103° C. Collection of a fraction rich in 2-acetoxy-butanal was then begun. Distillation was continued until the specific gravity after decreasing to 1.035 had increased to 1.065. At this point the collection of the fraction was discontinued. The fraction so collected consisted of 2000 c. c. of a liquid rich in 2-acetoxy-butanal which was refractionated as in Example 1 and which yielded a major proportion of 2-acetoxy-butanal of high purity.

Other modes of applying the principle of the invention may be employed instead of those explained, change being made as regards the method herein disclosed, provided the step or steps stated by any of the following claims or the equivalent of such stated step or steps be employed.

We, therefore, particularly point out and distinctly claim as our invention:

1. In a method for separating 2-acetoxy-butanal from a mixture selected from the class consisting of acetic oil and acetic oil which has been freed of acidic ingredients by neutralization, the steps which include: fractionally distilling the mixture and beginning collection of a fraction of distillate, which boils in the neighborhood of the boiling point of 2-acetoxy-butanal at the distillation pressure, when the specific gravity of the material distilling is decreasing and is approaching a region wherein its average rate of change with respect to the amount of material distilled is relatively small, and terminating collection of the fraction when the specific gravity has passed through and is receding from said region.

2. In a method for separating 2-acetoxy-butanal from acetic oil, the steps which include: fractionally distilling the acetic oil and beginning collection of a fraction of distillate, which boils in the neighborhood of the boiling point of 2-acetoxy-butanal at the distillation pressure, when the specific gravity of the material distilling is decreasing and is approaching a region wherein its average rate of change with respect to the amount of material distilled is relatively small, and terminating collection of the fraction when the specific gravity has passed through and is receding from said region.

3. In a method for separating 2-acetoxy-butanal from a mixture selected from the class consisting of acetic oil and acetic oil which has been freed of acidic ingredients by neutralization wherein the mixture is fractionally distilled and a fraction of distillate rich in 2-acetoxy-butanal is collected, the steps which include: beginning the collection of the fraction when the specific gravity of the material distilling is decreasing and is approaching a region wherein its average rate of change with respect to the amount of material distilled is relatively small; and terminating the collection of the fraction when the specific gravity has passed through and is receding from said region.

4. In a method for separating 2-acetoxy-butanal from acetic oil, the steps which include: fractionally distilling the acetic oil under reduced pressure and beginning the collection of a fraction of distillate, which boils in the neighborhood of the boiling point of 2-acetoxy-butanal at the distillation pressure, when the specific gravity of the material distilling is decreasing and is approaching a region wherein its average rate of change with respect to the amount of material distilled is relatively small, and terminating the collection of the fraction when the specific gravity has passed through and is receding from said region; neutralizing the collected fraction to a pH of from about 5.5 to about 8 at a temperature below 80° C.; separating the neutral organic components from the neutralized mixture; fractionally distilling said neutral organic components under reduced pressure and collecting a fraction of distillate consisting substantially of pure 2-acetoxy-butanal.

5. In a method for separating 2-acetoxy-butanal from acetic oil, the steps which include: freeing the acetic oil from acidic ingredients by neutralization at a temperature below 40° C. and to a pH value between 5.5 and 8; subsequently fractionally distilling the neutralized acetic oil and beginning collection of a fraction of distillate, which boils in the neighborhood of the boiling point of 2-acetoxy-butanal at the distillation pressure, when the specific gravity of the material distilling is decreasing and is approaching a region wherein its average rate of change with respect to the amount of material distilled is relatively small, and terminating collection of the fraction when the specific gravity has passed through and is receding from said region.

6. In a method for separating 2-acetoxy-butanal from acetic oil, the steps which include: fractionally distilling the acetic oil and beginning collection of a fraction of distillate, which boils in the neighborhood of the boiling point of 2-acetoxy-butanal at the distillation pressure, when the specific gravity of the material distilling is decreasing and is approaching a region wherein its average rate of change with respect to the amount of material distilled is relatively small, terminating collection of the fraction when the specific gravity has passed through and is receding from said region; and subsequently freeing the collected fraction from acidic ingredients by neutralizing the same at a temperature below 40° C. and to a pH value between 5.5 and 8.

ALFRED A. REITER.
FLOYD L. BEMAN.

REFERENCES CITED

The following references are of record in the file of this patent:

UNITED STATES PATENTS

| Number | Name | Date |
| --- | --- | --- |
| 1,868,102 | Henderson et al. | July 12, 1932 |
| 2,251,771 | Wynn et al. | Aug. 5, 1941 |
| 2,256,149 | Long | Sept. 16, 1941 |
| 2,309,937 | Dietrich | Feb. 2, 1943 |

OTHER REFERENCES

Shriner and Fuson, "The Systematic Identification of Organic Compounds," second edition (1940), published by John Wiley and Sons, Inc. (Copy in Library of Congress, pages 101–105.)

Industrial and Engineering Chemistry, vol. 30, pages 166–168 (Feb. 1938). (Copy in Scientific Library 202—42–H.)

Industrial and Engineering Chemistry, vol. 9, pages 462–464 (May 1917). (Copy in Scientific Library.)

Heilbronn, Dictionary of Organic Chemistry, published 1934 by Oxford University Press, New York, New York, vol. 1, page 12. (Copy in Division 6.)

Dworzak et al., "Monatschefte fur Chem., volume 52, page 143.

Wurtz, "Comptes Rendus," volume 74, page 1363.